(12) United States Patent
Codina Vilana et al.

(10) Patent No.: US 6,668,709 B1
(45) Date of Patent: Dec. 30, 2003

(54) CITRUS FRUIT SQUEEZER WITH CENTRIFUGATION OF THE SQUEEZED PRODUCT

(75) Inventors: Antonio Codina Vilana, Oliana (ES); Luis Trench Roca, Oliana (ES)

(73) Assignee: Electrodomesticos Taurus, S.L., Oliana (ES)

(*) Notice: Subject to any disclaimer, the term of this patent is extended or adjusted under 35 U.S.C. 154(b) by 0 days.

(21) Appl. No.: 10/311,326

(22) PCT Filed: Jun. 29, 2000

(86) PCT No.: PCT/ES00/00231

§ 371 (c)(1),
(2), (4) Date: Mar. 21, 2003

(87) PCT Pub. No.: WO02/00070

PCT Pub. Date: Jan. 3, 2002

(51) Int. Cl.[7] .............................. A23L 1/00; A23N 1/00; A23N 1/02; A47J 19/02; B02C 18/12
(52) U.S. Cl. ............................... 99/503; 99/501; 99/511
(58) Field of Search .................... 99/485, 486, 489, 99/492, 495, 501–508, 509–513; 241/101.01, 37.5, 92, 101.2, DIG. 17

(56) References Cited

U.S. PATENT DOCUMENTS

| | | | |
|---|---|---|---|
| 3,552,663 A | * 1/1971 | Royals | 241/DIG. 17 |
| 3,916,776 A | * 11/1975 | Arao et al. | 99/503 X |
| 4,125,064 A | * 11/1978 | Ackeret | 99/508 |
| 4,309,942 A | * 1/1982 | DaSilva, Jr. | 99/501 |
| 4,534,108 A | * 8/1985 | Yamamoto et al. | 99/504 |
| 4,706,559 A | * 11/1987 | DeZarate | 99/504 |
| 4,744,522 A | * 5/1988 | Borgmann et al. | 241/101.2 |
| 5,289,763 A | * 3/1994 | LeRouzic et al. | 99/503 |
| 5,875,706 A | * 3/1999 | Borger et al. | 99/510 X |
| 6,050,180 A | * 4/2000 | Moline | 99/511 |
| 6,065,861 A | * 5/2000 | Chen | 99/513 X |
| 6,202,547 B1 | * 3/2001 | Tseng et al. | 99/511 |
| 6,213,008 B1 | * 4/2001 | Kuan | 99/506 X |

* cited by examiner

Primary Examiner—Timothy F. Simone
(74) Attorney, Agent, or Firm—Jacobson Holman PLLC

(57) ABSTRACT

Appliance for squeezing citrus fruits with centrifugation of the product squeezed, composed of a milling cone (1) and a centrifuging bowl (2) provided with holes and/or slots (3) for filtering the juice or squeezed product which goes to a collecting container (4a, 4b), those cone (1) and bowl (2) are independent to each other, detachable and having independent rotation, being associated to different shafts (5 and 6) associated by respective drives (7 and 8) coupled to a single electric motor (9) or to several electric motors (10, 11) independent, cone (1) and centrifuging bowl (2) being driven at different speeds in same or opposite direction, and there exists a device for willingly annulling cone (1) or bowl (2) operation. The collecting bowl (4a, 4b) includes an external annular tank (17a, 17b) for collecting an excess of pulp thrown from bowl (2).

21 Claims, 2 Drawing Sheets

Figure 1:
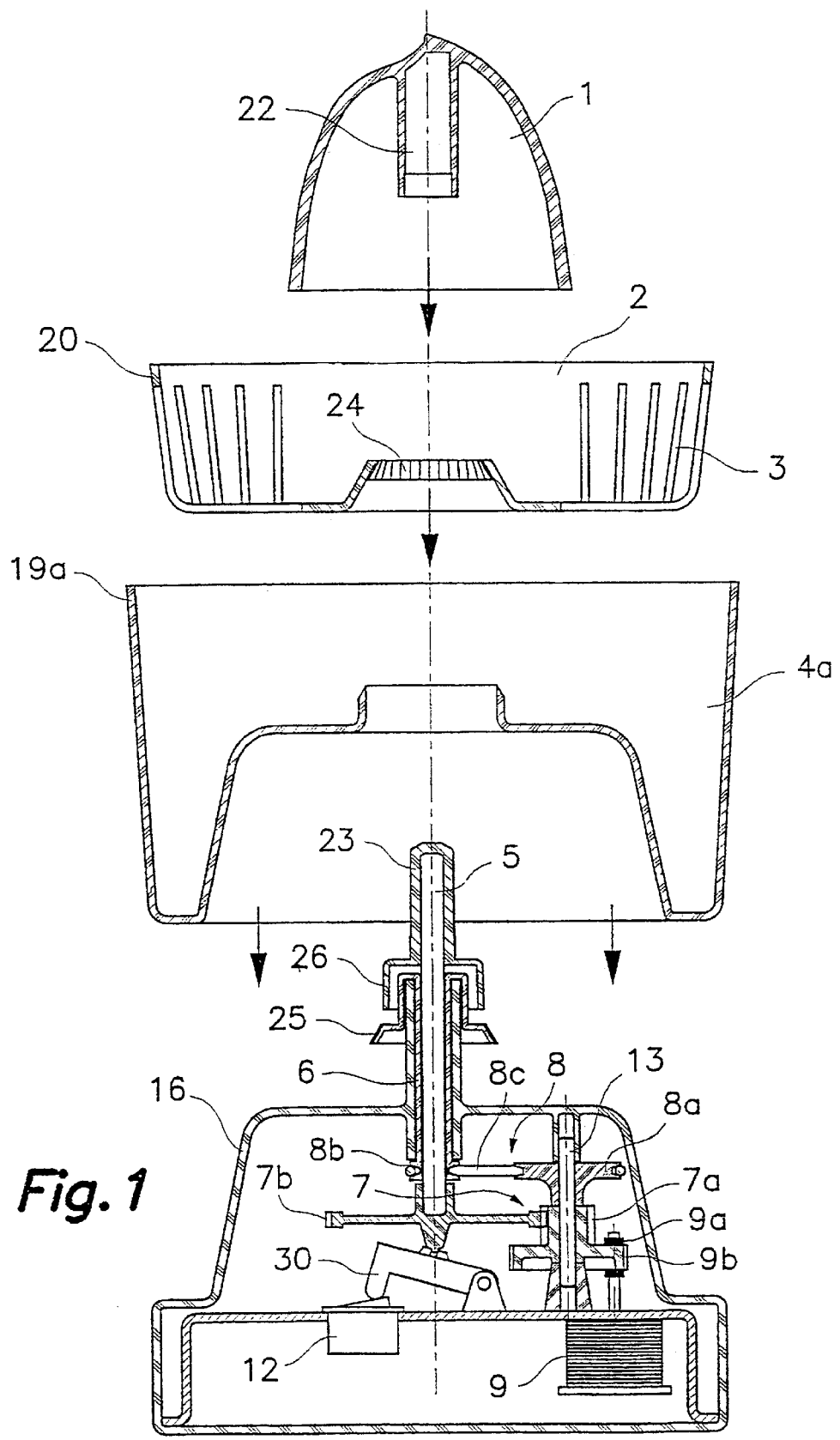

CITRUS FRUIT SQUEEZER WITH CENTRIFUGATION OF THE SQUEEZED PRODUCT

This is a nationalization of PCT/ES00/00231 filed Jun. 29, 2000 and published in Spanish.

FIELD OF THE INVENTION

This invention refers to an appliance for squeezing citrus fruits and centrifuging the product squeezed, in which a rotatory milling cone and a rotatory centrifuging bowl are constituted by two respectively independent elements, which are detachable and removable for their cleaning, the said elements being independent to each other in their rotation and provided with speeds respectively adapted for milling and centrifuging.

TECHNICAL BACKGROUND

The appliance disclosed is of the kind in which at least the said rotatory milling cone is driven by a small electric motor.

As devices of the state of the art, EP-A-423457 can be noted in which the cone is rotating at the centre of a stationary filtering bowl, and EP-A-623301, in which there exists. two twin devices, each formed by a cone and bowl integrated in a single rotatory unit.

On the market other appliances are also known in which as well the milling/squeezing cone as the said bowl form a single unit provided with rotating motion, and holes and/or slots are provided at the bottom of the bowl to assist juice from the product resulting from the milling cone action passing strained through them, the said juice, free of the largest pulp pieces goes to a collecting container located under the said bowl while the said pieces of pulp remain in the bowl. As generally the external diameter of the bowl is significantly wider that the diameter of the cone, the external peripheral wall of the bowl reaches, for a same angular speed, a linear speed substantially higher than the linear speed at the base of the cone, which provides an additional centrifuging and filtering action to the pieces of pulp located in the bowl, through holes and/or slots additionally provided for that purpose in the said external peripheral wall of the bowl.

In order to further enhance the said additional centrifuging action on the product squeezed, ES U-9302794 discloses an appliance for squeezing citrus fruits comprising a rotatory milling cone which forms a single part with a bowl comprising a bottom and an external peripheral wall provided with holes and slots for filtering and centrifuging the product squeezed, which is collected in a container. The said part is driven by an electric motor which is activated by downwardly and axially pushing the supporting shaft thereof on a pushbutton for connecting the electric motor to the mains. The appliance shows the feature of adopting two differentiated speed rating, one with slow rotation and high milling torque and another with quick rotation and high centrifuging power. This appliance possesses a mechanism based on gearing, belts and a clutch with which the said slow or quick rotation is selected. Thus, selectively, a juice only strained by gravity from the product squeezed or a juice which is additionally centrifuged can be obtained. Another similar embodiment is disclosed in ES P 8902260.

In above appliances, the fact that the milling cone forms part of the bowl is a drawback because it means that both elements rotate at same time and with same speed, high or slow, that is to say that when squeezing, the bowl also rotates at a slow speed, not suitable for a good centrifuging; when centrifuging, the cone also rotates at high speed, which is not suitable for a good milling and squeezing. Subsequently, a time is required for a good milling and another time for a quick centrifuging, each element wasting the rotation characteristics of the other. In addition, between the bottom of the bowl and the cone hardly accessible corners are formed which make cleaning difficult.

SHORT DESCRIPTION OF THE INVENTION

Therefore, an object of this invention is to provide an appliance for squeezing citrus fruits with centrifugation of the product squeezed comprising independent elements for each function and provided with rotating characteristics respectively suitable for the function of each element, that is to say: a slow speed with high driving torque for a milling cone and a relatively quick speed with a reduced driving torque for a centrifuging bowl.

Another object of this invention is to provide an appliance for squeezing citrus fruits and centrifuging the product squeezed which has means allowing, according to the convenience, to operate only the squeezing function, only the centrifuging function or both functions in time, with a subsequent saving of energy and an improvement to the versatility appliance.

Another additional object of the invention is to provide a squeezing appliance in which the parts which are contacting the fruit, pulp or juice, that is to say, a squeezing cone, a centrifuging bowl and a collecting container, are easily detachable and removable and having no corners hardly accessible for their cleaning.

These objects, according to this invention are essentially achieved by providing an appliance for squeezing citrus fruits and centrifuging the product squeezed provided with a milling cone and a centrifuging bowl independent to each other, and provided with rotating characteristics independent to each other, fully or partly mounted within a static collecting container, as well that cone as that bowl being removable, for example, for their cleaning. The said rotation characteristics independent to each other, of the milling cone and the centrifuging bowl are achieved associating the said elements to different shafts, independently driven by different drives connected to a sole motor or several independent motors. Preferably, the said independent shafts of the cone and the bowl are coaxial, the shaft of the cone being in an internal position and protruding at both ends of the shaft of the bowl, which is hollow for that purpose. The cone and the bowl are coupled to their respective shafts by easily releasable embedments.

When both shafts are connected through their respective drives to a sole motor, coupling/uncoupling mechanical or electromechanical means are provided for selectively activating only the squeezing function, only the centrifuging function or both functions at same time. In the event that both shafts are connected through their respective drives to two independent electric motors, electric connecting/disconnecting means have been provided, such as an external switch or selector for selectively activating the said functions. Preferably, the main drive is activated in a very well-known way with an internal pushbutton which is pressed by a downwards motion of the shaft of the bowl when a portion of fruit to be squeezed is applied on it, being automatically deactivated when the pressure on the said application stops.

To prevent splashing produced by an eventual excess of pulp in the bowl during a centrifuging action collecting means have been provided which comprise a small perimetric tank located close to a top edge of a side wall of the said collecting container, the said tank being optionally provided with an annular cover.

SHORT EXPLANATION OF THE DRAWINGS

Figure 2:
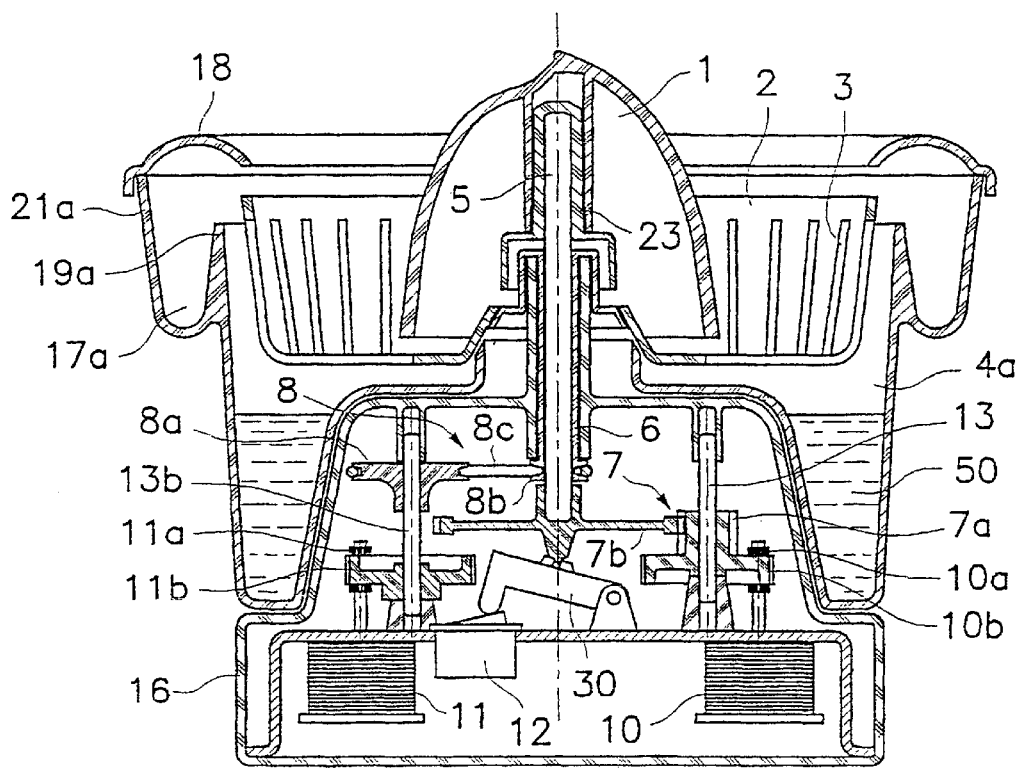
Figure 3:
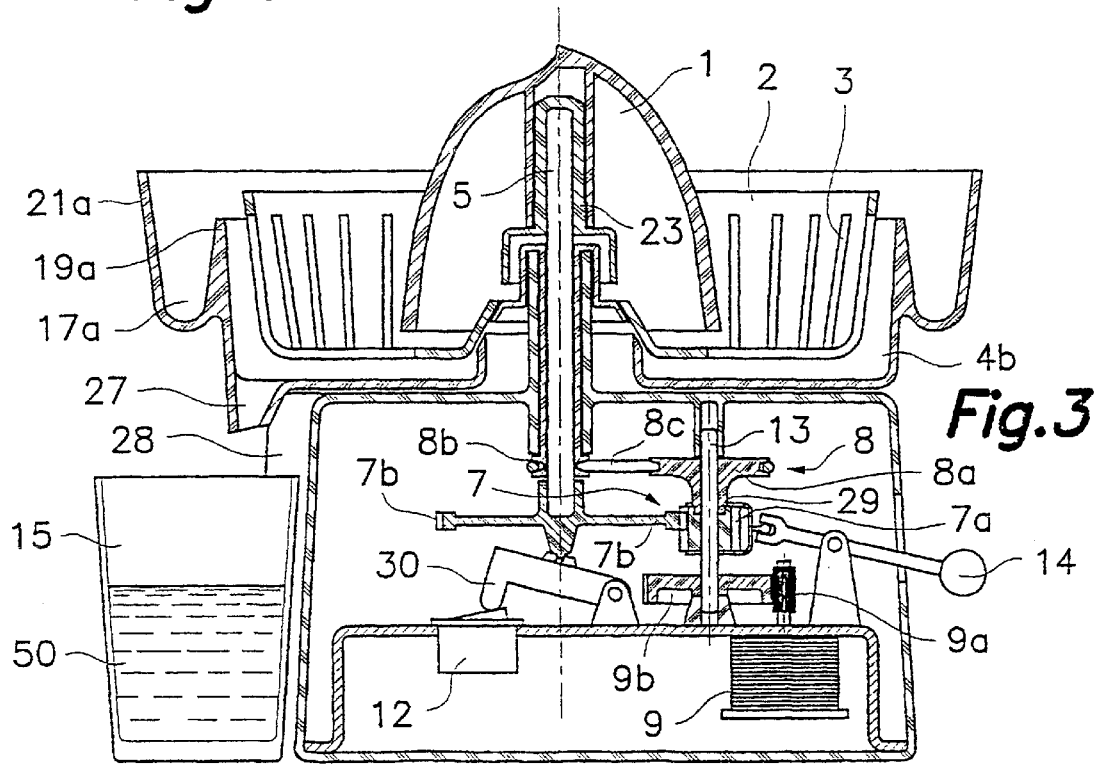

These and other details of this invention shall be best understood from following detailed description of non limitative examples of embodiment thereof, the description of which includes references to the drawings appended in which:

FIG. 1 is a simplified view, in sectional side elevation, exploded, of an example of embodiment of the squeezing appliance of this invention, comprising a collecting container having a blind bottom and a sole driving motor;

FIG. 2 is a simplified view, in sectional elevation, of another example of embodiment of the squeezing appliance of this invention, comprising a collecting container having a blind bottom with a tank for collecting the pulp provided with a cover and two driving motors; and FIG. 3 is a simplified view in sectional elevation, of a further example of embodiment of the squeezing appliance of this invention, comprising a collecting container with. a tank collecting the pulp and with an outlet pipe at its bottom, with a sole driving motor and a coupling/uncoupling device for the centrifuging function.

DETAILED DESCRIPTION OF THE PREFERRED EXAMPLES OF EMBODIMENT

It is important that, although in the three figures attached three different examples of embodiment of this invention are shown, each of them grouping given characteristics it should also be feasible to embody the appliance of the invention grouping another combination of the said characteristics, for example, comprising a collecting container with an outlet pipe at its bottom and without pulp collecting tank, and with two driving motors and so on.

Referring first to FIG. 1, the squeezing appliance of this invention basically comprises a rotatory milling cone 1, a centrifuging bowl 2 provided with holes and/or slots 3, at its bottom and external peripheral wall for filtering and centrifuging the product squeezed, a collecting bowl 4a for collecting the juice from the said product squeezed, and a housing 16 which houses different mechanisms for driving the said cone 1 and the said bowl 2.

In this invention, it must be pointed out that the said milling cone 1 and centrifuging bowl 2 are constituted by respective elements independent to each other, detachable and removable, for example, for washing them, and which may independently rotate at same or different speeds and in same or opposite direction. The collecting container 4a has a closed bottom and, although it is stationary, it is likewise removable for pouring the juice contained in it and cleaning it thereafter.

From the top part of housing 16 spin axis 5 and 6 are protruding, concentric to each other, which within housing 16 are coupled to a second-motion shaft 13 through respective drives 7 and 8, the said second-motion shaft 13 is in turn coupled to a single electric motor 9 by means of a gearing such as that formed by a pinion 9a and a gear wheel 9b.

In working position, cone 1 remains associated to the said shaft 5, which is the internal shaft, through fitting a hole with a protrusion 22 and an external part 23 coupled to the said shaft 5 while bowl 2 remains associated to shaft 6, which is the external shaft and therefore it is hollow, through gearing a ring bevel gear 24 close to the central passage of the bowl and a conical dentate surface 25 integral with the said shaft 6. The said external part 23 coupled to shaft 5 in addition comprises a covering hood 26 protecting against the entrance of foreign substances an area in which shaft 5 protrudes outwardly shaft 6. That arrangement of shafts 5 and 6 and the way in which cone 1 and bowl 2 are associated to each other is analogous in the examples of embodiment of FIG. 2 and 3.

In the example of FIG. 1, shaft 5 of cone 1, which as it was said is internal, possesses close to its lower end a follower wheel 7b geared with a pinion 7a integral with the said second-motion shaft 13. Forming an integral part with the said pinion 7a, there is the said gear wheel 9b geared in turn with driving pinion 9a, coming from the shaft of the said electric motor 9.

On the other hand, shaft 6 of bowl 2, which externally surrounds a part of the said shaft 5 of the cone, has at its lower end a follower pulley 8b linked by means of a belt 8c, which in this example is of the toric kind, and another driving pulley 8a also integral with second-motion shaft 13. Note that the said driving pulley 8a has a larger diameter than follower pulley 8b, while driving wheel 7a has a smaller diameter than follower wheel 7b therefore drive 8 of centrifuging bowl 2 carries out a speed multiplication with a decrease of the torque with respect to second-motion shaft 13 while drive 7 of the cone carries out a speed demultiplication with an increase of the torque with respect to same second-motion shaft 13. In addition, drive 7 by means of a gearing of a step provides a direction of rotation of outlet shaft 5 opposite to the direction of the rotation of outlet shaft of drive 8 formed by a pair of pulleys and one belt.

Thus, with this organisation and provided with those wheels having a convenient number of teeth and the said pulleys having suitable diameters, simultaneous rotation of cone 1 and bowl 2 will be obtained, with different speeds and in opposite directions, and more concretely, a slow rotation speed for the milling action of the former and a quick centrifuging speed for the later.

As mentioned above, removable collecting container 4a has a closed bottom so that all the juice from the product squeezed, filtered and centrifuged is accumulated within it, for which it has a deeper peripheral area which is arranged surrounding at least partly housing 16 provided to house the mechanisms, and incorporates a handle and a pouring pipe, not shown in the figures.

Referring now to FIG. 2, a squeezing appliance provided with cone 1, centrifuging bowl 2, collecting container 4 and a housing 16 from which shafts 5 and 6 protrude coaxial analogous to those of FIG. 1. For same parts same numerals have been used.

However, here two electric motors 10 and 11 has been arranged, one for driving cone 1 and the other for driving centrifuging bowl 2. Thus, a pinion 10a, integral with motor 10 output shaft drives a gear wheel 10b integral with a second-motion shaft 13, from which starts drive 7 for internal shaft 5 formed by a pinion 7a and a follower wheel 7b, analogous to that of FIG. 1. On the contrary, drive 8 of bowl 2, composed by pulleys 8a and 8b and belt 8c, transmit the motion from a second-motion shaft 13b, which is driven by electric motor 11 through a drive formed by a pinion 11a and a crown 11b. Preferably, motors 10 and 11 have available independent activating means, not shown, such as an external selector allowing to shift the current towards one or the other motor, or to both of them at same time, or to connect/disconnect one of the motors. With it same advantages are achieved as with the embodiment of FIG. 1 and the possibility is also provided to operate only one element, cone 1 or centrifuging bowl 2, as fit.

In this example of embodiment of FIG. 2 collecting container 4a in addition comprises, close to the external part of a top edge of a side wall 19a thereof, a perimetric annular recess-shaped tank 17a, limited by an external side wall 21a, provided for collecting an eventual excess of pulp outwardly thrown above a top edge of a peripheral side wall 20 of the said centrifuging bowl 2 coming from. an excessive accumulation of pulp in it caused by a continuous action of fruit milling and centrifuging. In a suitable way, the said top edge of peripheral side wall 20 of centrifuging bowl 2 is at a higher level that the top edge of side wall 19a of collecting container 4a, and lower than the top edge of the said external side wall 21a of the said tank 17a, which comprises a bottleneck area to let the pouring pipe (not shown) pass and includes an annular cover 18 to prevent that the said excess of pulp collected in the said tank 17a overflows when the juice contained in the collecting container 4a is poured.

Referring now to FIG. 3, a squeezing appliance is shown, provided with cone 1, centrifuging bowl 2 and housing 16 from which shafts 5 and 6 protrude coaxial analogous to those of FIG. 1. For same parts same numerals have been used.

In this example, the container is a shallow collecting container 4b which has in an area at its bottom, close to the periphery, an outlet hole or pipe 27 which ends in a side hollow recess 28 of housing 16 to house the mechanisms, adapted for placing a container, such as a glass for the juice 50 from the product squeezed, filtered and centrifuged, the said collecting container 4b being also removable for its cleaning.

Also in this case, collecting container 4b comprises a perimetric annular recess-shaped tank 17b, limited by an external side wall 21b. A top edge of peripheral side wall 20 of centrifuging bowl 2 remains at a higher level than a top edge of side wall 19b of collecting container 4b and lower than a top edge of the said external side wall 21b of the said tank 17b.

With respect to cone 1 and centrifuging bowl 2 drive, the mechanisms are analogous to those of FIG. 1 except that in the said driving pulley 8a of the drive of bowl 2 there is coupled a second-motion shaft 13 through an axial coupling, such as an embedment 29, with driving wheel 7a, which in turn is coupled to the said second-motion shaft 13 so that it is integral with it as for the rotation by sliding in its axial direction, a device being provided for moving driving wheel 7a along second-motion shaft 13 a length sufficient for not ungearing follower wheel 7b but sufficient for coupling/uncoupling the said axial coupling 29 between driving pulley 8a and driving wheel 7a. According to the example of embodiment illustrated in FIG. 3, the said device for moving driving wheel 7a comprises a lever 14 hand operated from outside, although it can also comprise, for example, an electromechanical actuator operated with an external switch. Although it has not been illustrated, also a device for coupling/uncoupling the drive of milling cone 1 can be provided so that the appliance would only operate as squeezer and strainer.

In any of above cases and illustrated in FIGS. 1 to 3, the activation of the device operation, that is to say milling cone 1, centrifuging bowl or both elements at same time, is carried out in a conventional way when applying a portion of fruit on the said cone pressing downwards on it. With it, cone 1 is moving downwards driving shaft 5, the lower end of which contacts through a lever 30, a pushbutton or lever of a switch lever 12 which connect to the mains, activating the said electric motors 9, 10 or 10, 11. For deactivating them it is enough to stop pressing so a spring own of the said switch 12 drives back the pushbutton to the closed position stopping the said connection to the mains and pushing shaft 5 and with it cone 1 newly upwards.

Some examples of embodiment having been disclosed and illustrated, it is stated that the squeezing appliance of this invention can be embodied with more convenient materials, for a more suitable size and with suitable means, the scope of all being defined in appended claims.

What is claimed is:

1. Appliance for squeezing citrus fruits and centrifuging the product squeezed, of the type comprising a removable, rotating milling cone (1) partly located within a removable, rotating centrifuging bowl (2) having apertures (3) at its bottom and/or peripheral wall (20) to provide filtering by centrifuging the squeezed product, said bowl (2) being placed in a removable collecting container (4a, 4b) seated on a housing (16) containing electromechanical members including at least one motor to independently operate coaxially rotating output shafts (5, 6), said cone (1) and centrifuging bowl (2) being coupled in a working position to said shafts (5, 6), respectively, characterized in that the shafts (5, 6) are coupled to said at least one motor through respective drives (7, 8), a device being comprised for voluntarily stopping the operation of one of said drives (7, 8) of shafts (5, 6) to let the other of said drives (7, 8) of shafts (5, 6) to operate alone.

2. Squeezing appliance according to claim 1, characterized in that said collecting container (4a, 4b) comprises, close to the external part of a top edge of a side wall (19a, 19b) thereof, a perimetric annular recess shaped tank (17a., 17b) limited by an external side wall (21a, 21b) provided for collecting an eventual excess of pulp outwardly thrown above a top edge of a peripheral side wall (20) of said centrifuging bowl (2) due to an excessive accumulation of pulp therein, said top edge of peripheral side wall (20) of centrifuging bowl (2) being at a higher level than said top edge of side wall (19a, 19b) of collecting container (4a, 4b) and lower than a top edge of said external side wall (21a, 21b) of said tank (17a, 17b).

3. Squeezing appliance according to claim 2 when it depends on claim 17, characterized in that said annular tank (17a) comprises a bottleneck area to let a pouring spout pass and includes an annular cover (18) to prevent that said excess of pulp collected in said tank (17a) overflows when the juice contained in the collecting container (4a) is poured.

4. Squeezing appliance according to claim 1, characterized in that said stopping device is for voluntarily stopping the operation of said drive (8) of shaft (6) associated to centrifuging bowl (2), so that the appliance operates as a squeezing-centrifuging appliance or only as a squeezing appliance.

5. Squeezing appliance according to claim 1, characterized in that said stopping device is for voluntarily stopping the operation of at least said drive (7) of shaft (5) associated to cone (1) so that the appliance operates as a squeezing-centrifuging appliance or only as a centrifuging appliance.

6. Squeezing appliance according to claim 1, characterized in that said stopping device is for voluntarily stopping the operation of either said drive (8) of shaft (6) associated to centrifuging bowl (2) or said drive (7) of shaft (5) associated to cone (1) so that the appliance operates as a squeezing-centrifuging appliance, only as a squeezing appliance or only as a centrifuging appliance.

7. Squeezing appliance according to the claim 1, characterized in that said drives (7, 8) of shafts (5, 6) respectively associated to cone (1) and bowl (2) are coupled to a single electric motor (9).

8. Squeezing appliance according to claim 1, characterized in that said drives (7, 8) of shafts (5, 6) respectively associated to cone (1) and bowl (2) are coupled to respective electric motors (10 and 11).

9. Squeezing appliance according to claim 7, characterized in that said drives (7 and 8) are such that the rotating directions of shafts (5, 6) respectively associated to cone (1) and bowl (2) are opposite.

10. Squeezing appliance according to claim 7, characterized in that said drives (7 and 8) are such that the rotating directions of shafts (5, 6) respectively associated to cone (1) and bowl (2) are same.

11. Squeezing appliance according to claim 7, characterized in that the linear speed at the basis of the periphery of said cone (1) is lower than the linear speed at the periphery of said centrifuging bowl (2).

12. Squeezing appliance according to claim 7, characterized in that said electric motor (9) operates either by direct coupling or through at least one demultiplication drive, a secondary shaft (13) attached thereto driving wheels (7a, 8a) of respective drives (7, 8) rotate which respectively couple follower wheels (7b, 8b) attached to respective shafts (5, 6).

13. Squeezing appliance according to claim 12, characterized in that said driving and follower wheels (7a, 7b) of drive (7) of shaft (5) associated to cone (1) are a pair of interconnected gear wheels while said driving and follower wheels (8a, 8b) of drive (8) of shaft (6) associated to bowl (2) are a pair of pulleys connected by a belt (8c).

14. Squeezing appliance according to claim 13, characterized in that said gearing drive (7) of shaft (5) associated to cone (1) carries out a speed demultiplication with an increase of the torque with respect to secondary shaft (13) while said drive (8) by belt of shaft (6) associated to bowl (2) carries out a speed multiplication with a decrease of the torque with respect to secondary shaft (13).

15. Squeezing appliance according to claim 13, characterized in that said driving pulley (8a) is coupled to said secondary shaft (13) through an axial coupling with the driving wheel (7a), which in turn is coupled to said secondary shaft (13) integrally as for the rotation but sliding in the axial direction thereof, a device being provided for moving driving wheel (7a), along secondary shaft (13) a length sufficient not to ungear follower wheel (7b) but sufficient for coupling/uncoupling said axial coupling between driving pulley (8a) and driving wheel (7a).

16. Squeezing appliance according to claim 15, characterized in that said device for moving the driving wheel (7a) comprises an electromechanical actuator activated by an external switch.

17. Squeezing appliance according to claim 15, characterized in that said device for moving driving wheel (7a) comprises a lever (14) hand operated from outside.

18. Squeezing appliance according to claim 8, characterized in that it comprises an external switch for activating/deactivating said motor (11) driving the shaft (6) associated to centrifuging bowl (2) or an external switch for activating/deactivating said motor (10) driving shaft (5) associated to cone (1) or an external selector for selectively deactivating any of the two motors (10, 11).

19. Squeezing appliance according to claim 1, characterized in that said collecting container (4a) shows a deeper peripheral area which is arranged surrounding at least part of housing (16), said collecting container (4a) being removable for pouring the collected juice and for cleaning said container.

20. Squeezing appliance according to claim 1, characterized in that said collecting container (4b) has at an area of its bottom close to the periphery an outlet hole which ends in a side hollow recess of housing (16) adapted for placing a container, such as a glass (15), said collecting container (4a) being removable for its cleaning.

21. Squeezing appliance according to claim 1, characterized in that a pushbutton (12) connecting to the mains is pressed by shaft (5) by means of an axial downwards push movement on cone (1) carried out by hand application of a portion of citrus fruit to be squeezed.

* * * * *